United States Patent
Kim et al.

(10) Patent No.: US 11,487,117 B2
(45) Date of Patent: Nov. 1, 2022

(54) DISPLAY APPARATUS HAVING WIDE VIEWING WINDOW

(71) Applicant: SAMSUNG ELECTRONICS CO., LTD., Suwon-si (KR)

(72) Inventors: Sunil Kim, Seoul (KR); Druzhin Vladislav, Moscow (RU); Malinina Polina, Moscow (RU); Bongsu Shin, Seoul (KR); Dubynin Sergey, Moscow (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 290 days.

(21) Appl. No.: 16/833,831

(22) Filed: Mar. 30, 2020

(65) Prior Publication Data

US 2021/0124171 A1  Apr. 29, 2021

(30) Foreign Application Priority Data

Oct. 24, 2019  (KR) .................. 10-2019-0133262

(51) Int. Cl.
*G02B 27/01* (2006.01)
*G02B 5/32* (2006.01)

(52) U.S. Cl.
CPC .......... *G02B 27/0172* (2013.01); *G02B 5/32* (2013.01); *G02B 27/0149* (2013.01); *G02B 2027/015* (2013.01); *G02B 2027/0123* (2013.01); *G02B 2027/0174* (2013.01); *G02B 2027/0178* (2013.01)

(58) Field of Classification Search
CPC .......... G02B 27/0172; G02B 27/0149; G02B 2027/0123; G02B 2027/015; G02B 2027/0174; G02B 2027/0178; G02B 5/32

USPC .......................................... 359/13
See application file for complete search history.

(56) References Cited

U.S. PATENT DOCUMENTS

| | | |
|---|---|---|
| 10,209,519 B2 | 2/2019 | Vieira et al. |
| 10,317,678 B2 | 6/2019 | Aksit et al. |
| 2009/0174919 A1 | 7/2009 | Moss |
| 2014/0226193 A1 | 8/2014 | Sun |
| 2016/0327796 A1 | 11/2016 | Bailey et al. |
| 2017/0123212 A1* | 5/2017 | Kawakami ......... G02B 27/0101 |
| 2018/0364482 A1 | 12/2018 | Georgiou et al. |
| 2022/0004007 A1* | 1/2022 | Bhakta ................ G02B 6/0018 |

OTHER PUBLICATIONS

Kim, Seong-Bok et al., "Optical see-through Maxwellian near-to-eye display with an enlarged eyebox", Optics Letters, vol. 43, No. 4, Feb. 15, 2018, pp. 767-770. (4 pages total).
Communication dated Oct. 7, 2020, issued by the European Patent Office in European Application No. 20170653.8.

* cited by examiner

*Primary Examiner* — Collin X Beatty
(74) *Attorney, Agent, or Firm* — Sughrue Mion, PLLC

(57) ABSTRACT

Provided a display apparatus including an image forming apparatus configured to form an image, a projection optical system configured to project the image formed by the image forming apparatus, and a combining optical system configured to provide the image projected from the projection optical system combined with light emitted from an external landscape, wherein the combining optical system is configured to divide the image projected from the projection optical system into same images and focus the same images on different positions.

23 Claims, 10 Drawing Sheets

DISPLAY APPARATUS HAVING WIDE VIEWING WINDOW

CROSS-REFERENCE TO RELATED APPLICATION

This application claims priority from Korean Patent Application No. 10-2019-0133262, filed on Oct. 24, 2019 in the Korean Intellectual Property Office, the disclosure of which is incorporated herein in its entirety by reference.

BACKGROUND

1. Field

Example embodiments of the present disclosure relate to a display apparatus such as an augmented reality system, and more particularly, to a display apparatus providing a wide viewing window while being miniaturized.

2. Description of Related Art

Recently, along with the development of electronic apparatuses and display apparatuses capable of implementing virtual reality (VR), interest in such apparatuses has increased. As a next step of VR, technology for implementing augmented reality (AR) and mixed reality (MR) has been researched.

Unlike VR that is based on a complete virtual world, AR is a display technique that shows the real world with virtual objects or information superimposed thereon, thereby further increasing the effect of reality. While VR is limitedly applied only to fields such as games or virtual experience, AR is advantageous in that it may be applied to various real environments. For example, AR attracts attention as next-generation display technology suitable for a ubiquitous environment or an Internet of things (IoT) environment. AR may be an example of MR in that it shows a mixture of the real world and additional information.

In order to manufacture a display apparatus capable of realizing such AR, for example, in the form of a head mounted type, glasses type, or goggles type, research is being conducted to miniaturize an optical system combining the real world with a virtual image. In addition, in a general AR display apparatus, it is necessary to place the eye at a very small focal size so that the correct image may be viewed, and even if the eye position is slightly out of the focus position, the image may not be properly viewed. Therefore, research is being conducted to enlarge a viewing window to observe an image.

SUMMARY

Example embodiments provide display apparatuses having a wide viewing window while being miniaturized.

Additional aspects will be set forth in part in the description which follows and, in part, will be apparent from the description, or may be learned by practice of the example embodiments of the disclosure.

According to an aspect of an example embodiment, there is provided a display apparatus including an image forming apparatus configured to form an image, a projection optical system configured to project the image formed by the image forming apparatus, and a combining optical system configured to provide the image projected from the projection optical system combined with light emitted from an external landscape, wherein the combining optical system is configured to divide the image projected from the projection optical system into same images and focus the same images on different positions.

The combining optical system may include a plurality of holographic optical elements sequentially provided along an optical path of the image projected from the projection optical system.

Each of the plurality of holographic optical elements may include a first surface configured to diffract a portion of incident light and transmit the remaining portion of the incident light, and a second surface provided opposite the first surface and configured to transmit incident light.

Each of the plurality of holographic optical elements may include a reflective holographic optical element configured to diffract incident light that is incident on the first surface and to focus the incident light that is diffracted in a space facing the first surface.

Each of the plurality of holographic optical elements may be configured to diffract incident light that is incident obliquely on the first surface and to converge the incident light that is diffracted in a direction perpendicular to the first surface.

The plurality of holographic optical elements may include a first holographic optical element and a second holographic optical element sequentially provided along the optical path of the image projected from the projection optical system, wherein the first holographic optical element is configured to focus the image projected from the projection optical system to a first position and to form a first image on the first position, and wherein the second holographic optical element is configured to focus the image projected from the projection optical system and transmitted by the first holographic optical element to a second position different from the first position and to form a second image on the second position.

The first holographic optical element may be configured to transmit an image that is diffracted by the second holographic optical element.

The first image and the second image may be identical to each other, and wherein the first position and the second position may be spaced apart from each other in a direction parallel to a first surface of the first holographic optical element.

The first position and the second position may be provided on a single plane parallel to the first surface of the first holographic optical element.

The first holographic optical element and the second holographic optical element may be identical to each other.

A focal length of the first holographic optical element may be different from a focal length of the second holographic optical element.

The first holographic optical element and the second holographic optical element may be provided to be shifted from each other in a direction parallel to a first surface of the first holographic optical element.

A diffraction efficiency of the second holographic optical element may be greater than a diffraction efficiency of the first holographic optical element.

The first holographic optical element and the second holographic optical element may be spaced apart from each other in a direction perpendicular to a first surface of the first holographic optical element.

A second surface of the first holographic optical element and a first surface of the second holographic optical element may be in contact with each other.

The combining optical system may include a holographic optical element and a plurality of translucent mirrors sequentially provided along an optical path of the image projected from the projection optical system.

The holographic optical element may include a first surface configured to diffract incident light, and a second surface provided opposite the first surface and configured to transmit incident light.

The holographic optical element may include a transmissive holographic optical element configured to diffract incident light that is incident on a first surface and to focus the incident light that is diffracted to a space facing a second surface.

The holographic optical element may be configured to diffract incident light that is divergent and incident obliquely on the first surface and to converge the incident light that is diffracted in a direction perpendicular to the second surface.

Each of the plurality of translucent mirrors may be configured to transmit a portion of incident light and reflect the remaining portion of the incident light, and the plurality of translucent mirrors may include a first translucent mirror and a second translucent mirror sequentially provided along the optical path of the image projected from the projection optical system.

The first translucent mirror may be configured to reflect an image diffracted by the holographic optical element and to form a first image a first position in a space facing the first surface of the holographic optical element, and the second translucent mirror may be configured to form a second image a second position that is different from the first position by reflecting an image diffracted by the holographic optical element and transmitted by the first translucent mirror.

The first image and the second image may be identical to each other, and the first position and the second position may be spaced apart from each other in a direction perpendicular to a first surface of a first holographic optical element.

An image reflected by the first translucent mirror and an image reflected by the second translucent mirror may converge and cross each other at a third position and a fourth position that is different from the third position in the space facing the first surface of the holographic optical element to form a third image and a fourth image, respectively.

The third image and the fourth image may be identical to each other, and the third position and the fourth position may be spaced apart from each other in a direction parallel to a first surface of a first holographic optical element.

A reflectance of the second translucent mirror may be greater than a reflectance of the first translucent mirror.

The display apparatus may include a virtual reality (VR) display apparatus, an augmented reality (AR) display apparatus, or a mixed reality (MR) display apparatus implemented in a form of a head mounted type apparatus, glasses type apparatus, or goggles type apparatus.

According to another aspect of an example embodiment, there is provided a display apparatus including an image forming apparatus configured to form an image, a projection optical system configured to project the image formed by the image forming apparatus, and a combining optical system configured to provide the image projected from the projection optical system combined with light emitted from an external landscape, the combining optical system including a plurality of holographic optical elements sequentially provided along an optical path of the image projected from the projection optical system, wherein the plurality of holographic optical elements are configured to respectively focus a same image on different positions

BRIEF DESCRIPTION OF THE DRAWINGS

The above and/or other aspects, features, and advantages of example embodiments of the disclosure will be more apparent from the following description taken in conjunction with the accompanying drawings, in which.

DETAILED DESCRIPTION

Figure 1:
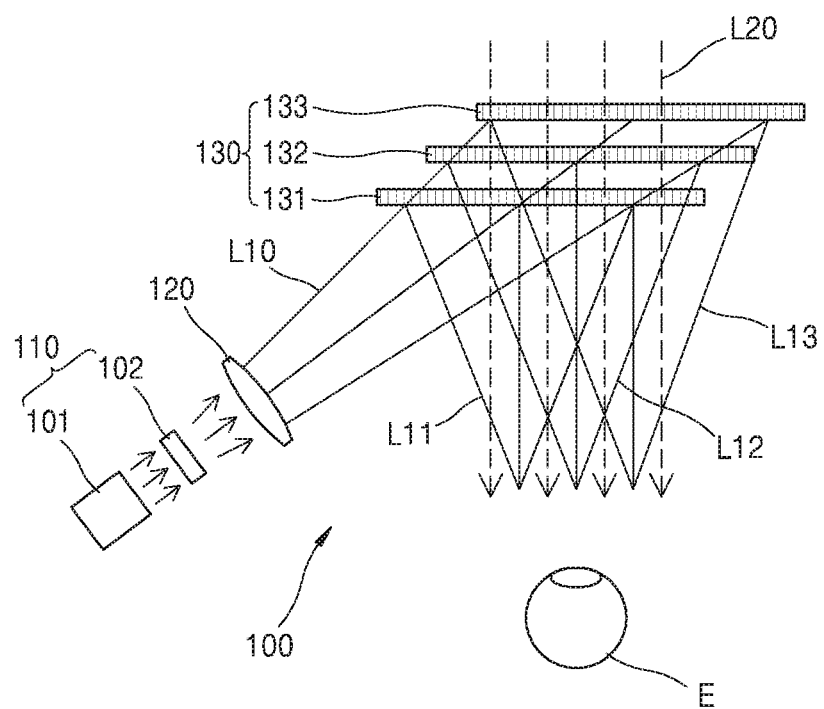
FIG. 1 is a view of a configuration of a display apparatus according to an example embodiment.

Hereinafter, a display apparatus having a wide viewing window will be described in detail with reference to the accompanying drawings. The same reference numerals refer to the same elements throughout. In the drawings, the sizes of constituent elements may be exaggerated for clarity. The example embodiments described below are merely exemplary, and various modifications may be possible from the example embodiments. In a layer structure described below, an expression such as "above" or "on" may include not only the meaning of "immediately on/under/to the left/to the right in a contact manner", but also the meaning of "on/under/to the left/to the right in a non-contact manner".

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

FIG. 1 is a view of a configuration of a display apparatus 100 according to an example embodiment. Referring to FIG. 1, the display apparatus 100 according to an example embodiment may include an image forming apparatus 110 for forming an image, a projection optical system 120 for projecting the image generated by the image forming apparatus 110, and a combining optical system 130 configured to combine the image projected from the projection optical system 120 and light containing and propagating from an external landscape to an observer.

The image forming apparatus 110 may be configured to form an image L10 containing virtual reality or virtual information. In order to form the image L10, the image forming apparatus 110 may include a light source 101 and a spatial light modulator 102. The image forming apparatus 110 may further include an image processor for providing a digital image data signal to the spatial light modulator 102. In an example embodiment, the light source 101 may be configured to provide collimated white light as illumination light. For example, the light source 101 may include a light emitting diode (LED) and a collimating lens. In addition, the spatial light modulator 102 may include a liquid crystal modulator having an array of a plurality of pixels arranged two dimensionally. The image L10 provided from the image forming apparatus 110 may be a general two-dimensional image.

In another example embodiment, the light source 101 may be a coherent light source that emits coherent light. For example, the light source 101 may include a laser diode LD. The spatial light modulator 102 may be configured to display a hologram pattern according to a hologram data signal provided from an image processor, for example, a computer generated hologram (CGH) signal. For example, the spatial light modulator 102 may be a phase modulator capable of performing only phase modulation, an amplitude modulator capable of performing only amplitude modulation, and a complex modulator capable of performing both phase modulation and amplitude modulation. In this case, the image L10 provided from the image forming apparatus 110 may be a holographic image having three-dimensional information.

The projection optical system 120 is configured to enlarge the image L10 formed by the image forming apparatus 110 and project the image L10 onto the combining optical system 130. Although the projection optical system 120 is shown as only one lens element as an example in FIG. 1, the projection optical system 120 may actually include a plurality of lens elements to compensate for aberrations and distortions. In addition, the projection optical system 120 may be located to be inclined with respect to the combining optical system 130 in a lateral direction of the combining optical system 130 to not obstruct an optical path between the combining optical system 130 and an observer's eye E. Then, the image L10 enlarged and diverged by the projection optical system 120 may be obliquely incident on the combining optical system 130.

The combining optical system 130 is configured to combine the image L10 projected from the projection optical system 120 with external light L20 containing and propagating from an external landscape to provide to an observer. For example, the combining optical system 130 may be configured to reflect the image L10 projected from the projection optical system 120 and transmit the external light L20 containing and propagating from the external landscape. The external light L20 is not an artificial image generated by being modulated by a separate spatial light modulator or displayed by a separate display panel, but includes an actual landscape in front of an observer. Therefore, the observer may simultaneously recognize an artificially generated virtual image L10 and the actual landscape. In this regard, the display apparatus 100 according to the example embodiment may be applied to implement augmented reality (AR) or combined reality (MR). In particular, the display apparatus 100 according to the present embodiment may be a near-eye AR display apparatus.

Moreover, in order to enlarge a viewing window of the display apparatus 100, the combining optical system 130 may be configured to divide the image L10 projected from the projection optical system 120 into same images L11, L12, and L13 to focus on a plurality of different positions. For example, the combining optical system 130 may include first to third holographic optical elements 131, 132, and 133 sequentially arranged along an optical path of the image L10 projected from the projection optical system 120. FIG. 1 illustrates the three holographic optical elements, that is, the first holographic optical element 131, the second holographic element 132, and the third holographic element 133, by way of example, but is not necessarily limited thereto. The combining optical system 130 may include two or more holographic optical elements as needed.

Figure 2:
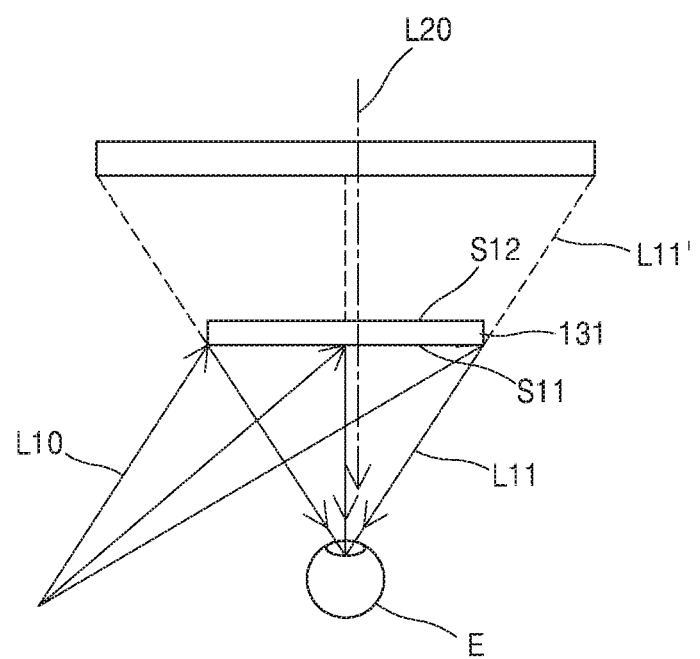
FIG. 2 is an exemplary view of a configuration and operation of a first holographic optical element (HOE) of the display apparatus illustrated in FIG. 1.

FIG. 2 is an exemplary view of a configuration and operation of the first holographic optical element 131 of the display apparatus 100 illustrated in FIG. 1. Referring to FIG. 2, the first holographic optical element 131 of the display apparatus 100 may include a first surface S11 configured to diffract a portion of incident light and transmit the remaining portion of the incident light, and a second surface S12 located opposite the first surface S11 and configured to transmit incident light. In particular, the first holographic optical element 131 may be a reflective holographic optical element configured to diffract incident light incident on the first surface S11 to focus the incident light in a space facing the first surface S11.

In this case, a portion of the image L10 projected from the projection optical system 120 is diffracted at the first surface S11 of the first holographic optical element 131 and focused at a focal point in the space facing the first surface S11. As a result, a first image L11 replicated by the first holographic optical element 131 is formed on the focal point. When the observer's eye E is located at the focal point of the first holographic optical element 131, the observer sees an enlarged virtual image L11' opposite the first holographic optical element 131. In addition, since the second surface S12 of the first holographic optical element 131 transmits incident light as it is, the observer may see the light L20 containing and propagating from the external landscape on the opposite side of the first holographic optical element 131. Thus, the observer may view the virtual first image L11 replicated by the first holographic optical element 131 together with the actual external landscape.

The first surface S11 of the first holographic optical element 131 may include fine two-dimensional or three-dimensional patterns of materials having different refractive indices such that incident light may be diffracted and focused at a certain focal position. Then, the first surface S11 of the first holographic optical element 131 may collect light at one point by changing a traveling direction of light by diffracting the light incident in a specific angular range and generating destructive interference and constructive interference depending on the size, height, period, etc. of patterns.

In particular, since the image L10 enlarged and diverged by the projection optical system 120 is incident obliquely on the first surface S11 of the first holographic optical element 131, the first surface S11 of the first holographic optical element 131 may be configured to diffract incident light that is divergent and incident obliquely on the first surface S11 and converge the incident light in a direction perpendicular to the first surface S11. For this purpose, reference light having the same divergence angle as that of the image L10 projected by the projection optical system 120 is radiated onto a first surface of a photosensitive material in the form of a plate. An incident angle at which the reference light is incident on the photosensitive material is set equal to an angle at which the image L10 is incident on the first surface S11 of the first holographic optical element 131. At the same time, the photosensitive material may be irradiated with object light that passes through the photosensitive material from the second surface of the photosensitive material to the first surface of the photosensitive material and converges at a certain focal length facing the first surface of the photosensitive material using a convex lens or the like. Then, an interference pattern of the reference light and the object light is formed on the photosensitive material, and the first holographic optical element 131 may be manufactured by developing the photosensitive material exposed by the interference pattern.

When the image L10 having the same divergence angle as that of the reference light is incident on the first surface S11 of the first holographic optical element 131 at the same incident angle as that of the reference light, light diffracted at the first surface S11 of the first holographic optical element 131 converges at a certain focal length while traveling in the same direction as that of the object light to form the first image L11. For example, chief ray of the image L10 projected by the projection optical system 120 is diffracted near the center of the first surface S11 of the first holographic optical element 131 to travel in a direction perpendicular to the first surface S11 of the first holographic optical element 131. In addition, marginal ray of the image L10 projected by the projection optical system 120 is diffracted near the edge of the first surface S11 of the first holographic optical element 131 to travel in a direction that converges toward the center light. Then, the chief ray and the marginal ray are collected at a focal point in the space facing the first surface S11 of the first holographic optical element 131.

Referring again to FIG. 1, the first holographic optical element 131, the second holographic optical element 132, and the third holographic optical element 133 are sequentially arranged along the optical path of the image L10 projected by the projection optical system 120. Configurations and operations of the second and third holographic optical elements 132 and 133 may be the same as the configuration and operation of the first holographic optical element 131 described above. For example, each of the second holographic element 132 and the third holographic element 133 may include a first surface that diffracts a portion of incident light and transmits the remaining portion, and a second surface that transmits incident light as it is. In addition, the first surface of the second holographic optical element 132 is configured to diffract the divergent image L10 incident obliquely from the projection optical system 120 to form a second image L12 on a certain focal point, and the first surface of the third holographic optical element 133 may be configured to diffract the divergent image L10 incident obliquely from the projection optical system 120 to form a third image L13 on a certain focal point.

In the configuration of the combining optical system 130 comprising the first holographic optical element 131, the second holographic element 132, and the third holographic element 133, a portion of the image L10 projected by the projection optical system 120 is diffracted by the first surface S11 of the first holographic optical element 131 to form the first image L11. The remaining portion of the image L10 projected by the projection optical system 120 passes through the first holographic optical element 131 and is incident on the second holographic optical element 132. A portion of the image L10 incident on the second holographic optical element 132 is diffracted at the first surface of the second holographic optical element 132 and passes through the first holographic optical element 131 to form the second image L12. In addition, the remaining portion of the image L10 incident on the second holographic optical element 132 passes through the second holographic optical element 132 and is incident on the third holographic optical element 133. A portion of the image L10 incident on the third holographic optical element 133 is diffracted at a first surface of the third holographic optical element 133 and passes through the first holographic optical element 131 in turn to form the third image L13. The first image L11, the second image L12, and the third image L13 are all formed from the image L10 projected by the projection optical system 120, and thus, may be the same.

Figure 3A:
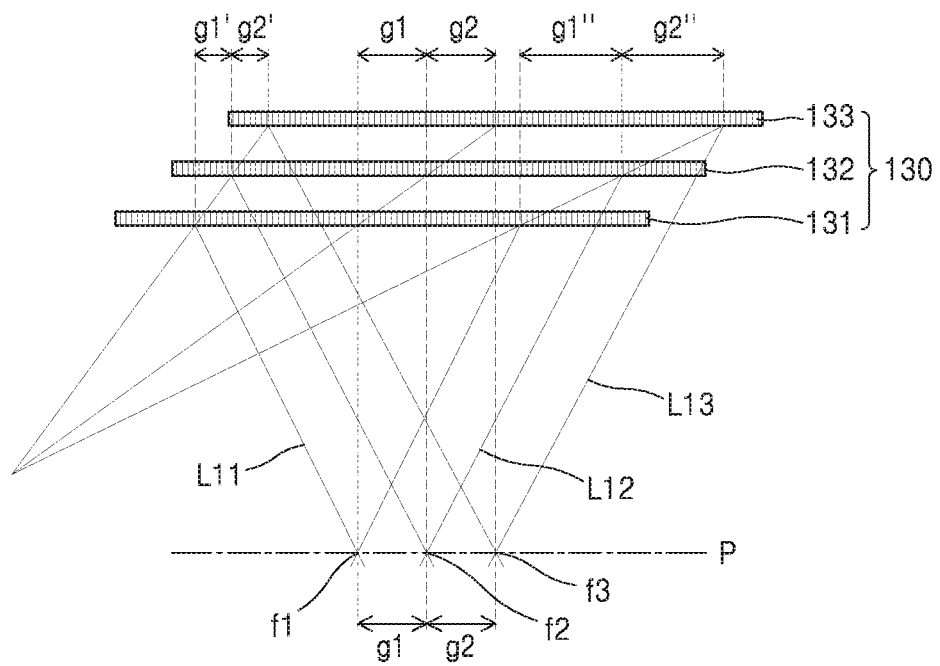
FIG. 3A is an exemplary view of a configuration and operation of a combiner of the display apparatus illustrated in FIG. 1.

According to the present embodiment, the combining optical system 130 may be configured to have different focal positions in a horizontal direction in which the first image L11, the second image L12, and the third image L13 are formed. For example, FIG. 3A illustrates an example of a configuration and operation of the combining optical system 130 of the display apparatus 100 illustrated in FIG. 1. Referring to FIG. 3A, since the image L10 projected by the projection optical system 120 is inclined, the first holographic optical element 131, the second holographic element 132, and the third holographic element 133 may be shifted with respect to each other in an inclination direction of the image L10. For example, when the image L10 is inclined from the left side to the right side, the second holographic optical element 132 may be shifted in a right direction and located in parallel with the first holographic optical element 131. In addition, the third holographic optical element 133 may be shifted in a right direction and located in parallel with the second holographic engineering element 132.

In addition, the first holographic optical element 131, the second holographic element 132, and the third holographic element 133 may be located at different positions in a vertical direction. A horizontal direction may be defined as a direction parallel to the first and second surfaces of each of the first holographic optical element 131, the second holographic element 132, and the third holographic element 133, and the vertical direction may be defined as a direction perpendicular to the first and second surfaces of each of the first holographic optical element 131, the second holographic element 132, and the third holographic element 133. For example, the second holographic optical element 132 may be located farther in the vertical direction than the first holographic optical element 131 from the projection optical system 120, and the third holographic optical element 133 may be located farther in the vertical direction from the projection optical system 120 than the second holographic optical element 132.

Therefore, a position at which the chief ray of the image L10 projected by the projection optical system 120 is incident on the first surface of each of the first holographic optical element 131, the second holographic element 132, and the third holographic element 133 is moved in the horizontal direction. For example, a horizontal gap between a position at which the chief ray of the image L10 projected by the projection optical system 120 is incident on a central portion of the first surface of the first holographic optical element 131 and a position at which the chief ray of the image L10 projected by the projection optical system 120 is incident on a central portion of the first surface of the second holographic optical element 132 may be g1. Also, a horizontal gap between a position at which the chief ray of the image L10 projected by the projection optical system 120 is incident on the central portion of the first surface of the second holographic optical element 132 and a position at which the chief ray of the image L10 projected by the projection optical system 120 is incident on a central portion of the first surface of the third holographic optical element 133 may be g2. The gap g1 may be determined as a vertical gap between the first holographic optical element 131 and the second holographic optical element 132, and the gap g2 may be determined as a vertical gap between the second holographic optical element 132 and the third holographic optical element 133.

In addition, a position at which the marginal ray of the image L10 projected by the projection optical system 120 is incident on the first surface of each of the first holographic optical element 131, the second holographic element 132, and the third holographic element 133 is also moved in the horizontal direction. For example, a horizontal gap between a position at which the marginal ray of the image L10 projected by the projection optical system 120 is incident on the left edge of the first surface of the first holographic optical element 131 and a position at which the marginal ray of the image L10 projected by the projection optical system 120 is incident on the left edge of the first surface of the second holographic optical element 132 may be g1', and a horizontal gap between a position at which the marginal ray of the image L10 projected by the projection optical system 120 is incident on the left edge of the first surface of the second holographic optical element 132 and a position at which the marginal ray of the image L10 projected by the projection optical system 120 is incident on the left edge of the first surface of the third holographic optical element 133 may be g2'. Also, a horizontal gap between a position at which the marginal ray of the image L10 projected by the projection optical system 120 is incident on the right edge of the first surface of the first holographic optical element 131 and a position at which the marginal ray of the image L10 projected by the projection optical system 120 is incident on the right edge of the first surface of the second holographic optical element 132 may be g1", and a horizontal gap between a position at which the marginal ray of the image L10 projected by the projection optical system 120 is incident on the right edge of the first surface of the second holographic optical element 132 and a position at which the marginal ray of the image L10 projected by the projection optical system 120 is incident on the right edge of the first surface of the third holographic optical element 133 may be g2". When the image L10 projected by the projection optical system 120 is inclined from the left to the right, g1'<g1<g1" and g2'<g2<g2".

As described above, the first holographic optical element 131 focuses the image L10 projected from the projection optical system 120 on a first focal point f1 to form the first image L11 on the first focal point f1. In addition, the second holographic optical element 132 focuses the image L10 projected from the projection optical system 120 on a second focal point f2 to form the second image L12 on the second focal point f2, and the third holographic optical element 133 focuses the image L10 projected from the projection optical system 120 on a third focal point f3 to form the third image L13 on the third focal point f3. Since the chief ray of the image L10 incident on the first surface of each of the first holographic optical element 131, the second holographic element 132, and the third holographic element 133 travels in a direction perpendicular to the first surface, a horizontal gap between the first focal point f1 and the second focal point f2 may be equal to g1, and a horizontal gap between the second focal point f2 and the third focal point f3 may be equal to g2.

Therefore, the first image L11, the second image L12, and the third image L13 respectively formed by the first holographic optical element 131, the second holographic element 132, and the third holographic element 133 may be spaced apart from each other in the horizontal direction. For example, the first image L11 and the second image L12 may be spaced apart from each other by g1 in the horizontal direction, and the second image L12 and the third image L13 may be spaced apart from each other by g2 in the horizontal direction. Then, the observer may view the same image L10 at the position of the first focal point f1, at the position of the second focal point f2, or at the position of the third focal point f3. As a result, an area in a horizontal direction, that is, a viewing window, in which the observer may view the image L10 may be enlarged. The gaps g1 and g2 may be chosen to be greater than the diameter of the pupil of the observer's eye E such that at least two of the first image L11, the second image L12, and the third image L13 are not incident on the pupil of the observer's eye E together.

Also, as shown in FIG. 3A, the first focal point f1, the second focal point f2, and the third focal point f3 may be arranged on the same single plane P in the horizontal direction. The plane P may be arranged, for example, in parallel with the first and second surfaces of each of the first holographic optical element 131, the second holographic element 132, and the third holographic element 133. In this case, the first holographic optical element 131, the second holographic element 132, and the third holographic element 133 may have different focal lengths. For example, the focal length of the second holographic optical element 132 may be greater than the focal length of the first holographic optical element 131, and the focal length of the third holographic optical element 133 may be greater than the second holographic optical element 132. In other words, the shortest distance between the second focal point f2 and the first surface of the second holographic optical element 132 may be greater than the shortest distance between the first focal point f1 and the first surface of the first holographic optical element 131. The shortest distance between the third focal point f3 and the first surface of the third holographic optical element 133 may be greater than the shortest distance between the second focal point f2 and the first surface of the second holographic optical element 132.

Figure 3B:
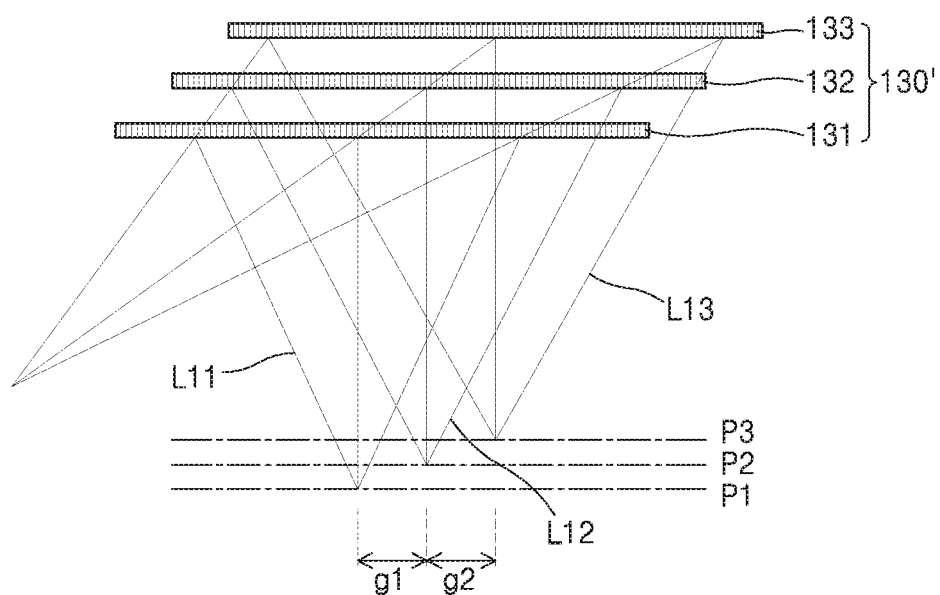
FIG. 3B is an exemplary view of another example of configuration and operation of the combiner of the display apparatus illustrated in FIG. 1.

FIG. 3B illustrates another example of a configuration and operation of a combining optical system 130' of the display apparatus 100 illustrated in FIG. 1. Referring to FIG. 3B, the first holographic optical element 131, the second holographic element 132, and the third holographic element 133 may all have the same focal length. In this case, the first focal point f1, the second focal point f2, and the third focal point f3 may be placed on the first plane P1, the second plane P2, and the third plane P3 spaced apart from each other in the vertical direction, respectively. For example, the first holographic optical element 131, the second holographic element 132, and the third holographic element 133 may all be the same holographic optical element. The remaining configurations and operations of the combining optical system 130' illustrated in FIG. 3B may be the same as the configuration and operation of the combining optical system 130 described with reference to FIG. 3A.

Although the first holographic optical element 131, the second holographic element 132, and the third holographic element 133 all have the same focal length, the first holographic optical element 131, the second holographic element 132, and the third holographic element 133 may be designed differently. For example, the first holographic optical element 131, the second holographic element 132, and the third holographic element 133 may be designed to have different diffraction efficiencies. The second image L12 is formed by diffracting a portion of the image L10 that is not diffracted by the first holographic optical element 131, and the third image L13 is formed by diffracting a portion of the image L10 that is not diffracted by the first holographic optical element 131 and the second holographic optical element 132. Thus, the second image L12 may be darker than the first image L11, and the third image L13 may be darker than the second image L12. Therefore, the third holographic optical element 133 may be designed to have a higher diffraction efficiency than the second holographic optical element 132 and the second holographic optical element 132 may be designed to have a higher diffraction efficiency than the first holographic optical element 131 such that the first image L1, the second image L2, and the third image L3 may have almost the same brightness. The selection of the diffraction efficiency of the first holographic optical element 131, the second holographic element 132, and the third holographic element 133 may be equally applied to the combining optical system 130 shown in FIG. 3A.

In FIGS. 3A and 3B, the three identical images L1, L2, and L3 are formed using the three holographic optical elements, for example, the first holographic optical element 131, the second holographic element 132, and the third holographic element 133, respectively. However, the number of holographic optical elements, for example, the first holographic optical element 131, the second holographic element 132, and the third holographic element 133, and the number of images L1, L2, and L3 are merely examples, and embodiments are not necessarily limited thereto. The number of holographic optical elements may be selected as four or more within the limits allowed by the internal space of the display apparatus 100.

Figure 4:
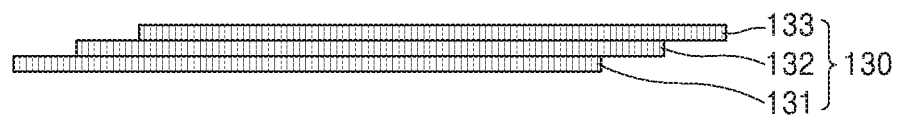
FIG. 4 is an exemplary view of a configuration of a combiner according to another example embodiment.

FIG. 4 is an exemplary view of a configuration of a combining optical system 130" according to another example embodiment. Referring to FIG. 4, the combining optical system 130" may include the first holographic optical element 131, the second holographic element 132, and the third holographic element 133 in contact with each other. FIGS. 3A and 3B show that the first holographic optical element 131, the second holographic element 132, and the third holographic element 133 are spaced apart from each other in the vertical direction. However, embodiments are not limited thereto. The first image L1, the second image L2, and the third image L3 may be spaced apart from each other in the horizontal direction to not be incident on the pupil of the observer's eye E at once, however, embodiments are not limited thereto. For example, the first holographic optical element 131, the second holographic element 132, and the third holographic element 133 may be arranged to contact each other. For example, the first holographic optical element 131 and the second holographic optical element 132 may be arranged such that the second surface of the first holographic optical element 131 and the first surface of the second holographic optical element 132 are in contact with each other. Also, the second holographic optical element 132 and the third holographic optical element 133 may be arranged such that the second surface of the second holographic optical element 132 and the first surface of the third holographic optical element 133 are in contact with each other.

According to the example embodiments described above, an optical system of a combining optical system for combining the real world and the virtual image may be simplified into a holographic optical element. Therefore, the combining optical system may be downsized, and the display apparatus 100 capable of realizing AR including the combining optical system may also be downsized. In addition, when the holographic optical device is used, a focal length of the combining optical system may be more easily reduced, and thus, a viewing angle of the display apparatus 100 may be more easily increased. In addition, according to the example embodiments, it is possible to enlarge a viewing window for observing an accurate image by replicating one virtual image provided from one image forming apparatus 110 with a plurality of holographic optical elements into the same images and simultaneously providing the identical images to a plurality of different positions in a horizontal direction. Therefore, the display apparatus 100 may have a wide viewing window.

Figure 5:
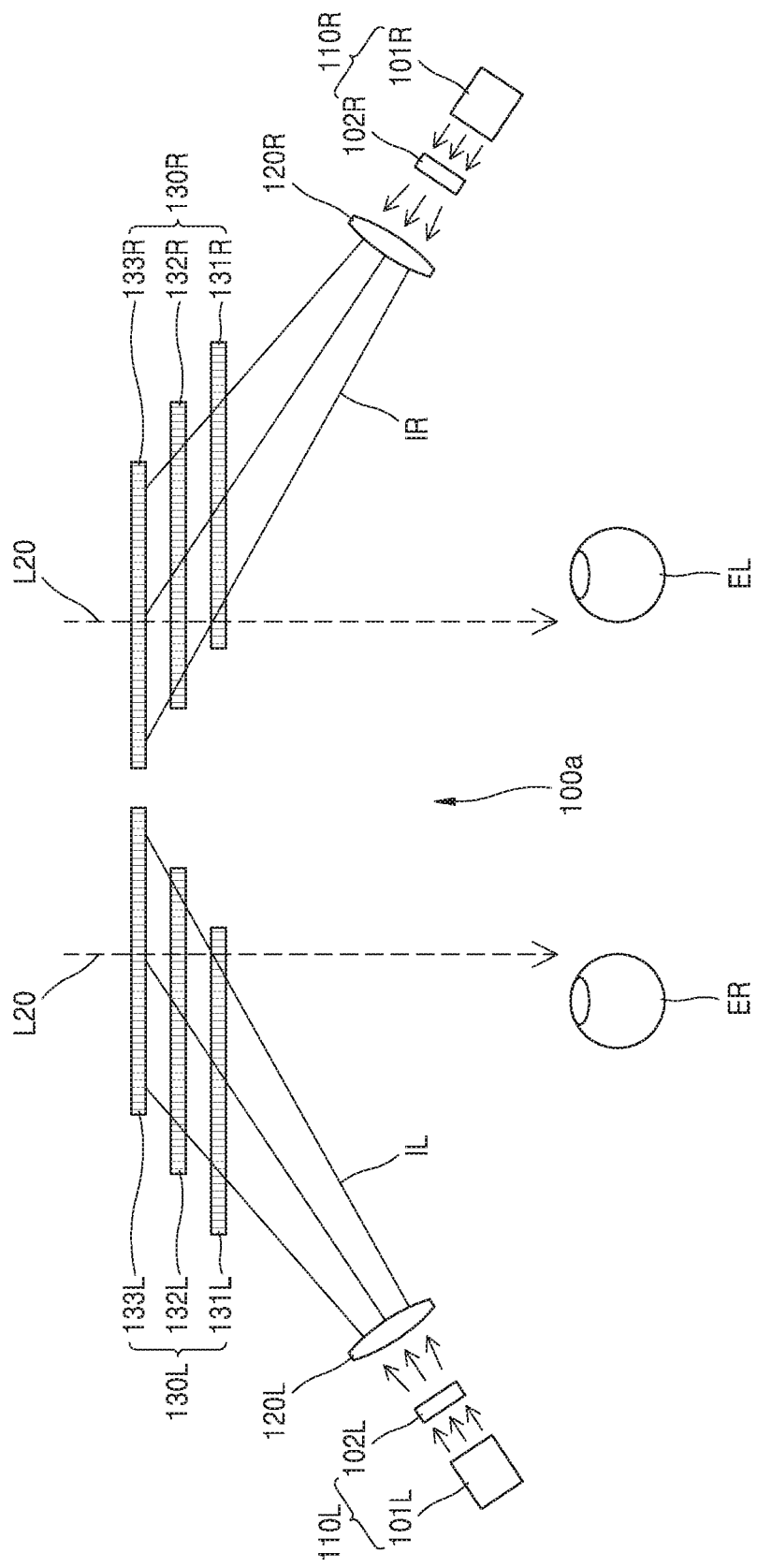
FIG. 5 is a view of a configuration of a display apparatus according to another example embodiment.

The display apparatus 100 shown in FIG. 1 may provide an image only to one eye E of an observer. However, it is also possible to configure the display apparatus to provide an image to both eyes of the observer. For example, FIG. 5 schematically shows a configuration of a display apparatus 100*a* according to another example embodiment. Referring to FIG. 5, the display apparatus 100*a* according to another example embodiment may include a left-eye image forming apparatus 110L for forming a left-eye image IL, a left eye projection optical system 120L for projecting the left-eye image IL, and a left eye combining optical system 130L configured to combine the left-eye image IL with the light L20 containing and propagating from the external landscape to an observer, and may further include a right-eye image forming apparatus 110R for forming a right-eye image IR, a right eye projection optical system 120R for projecting the right-eye image IR, and a right eye combining optical system 130R configured to combine the right-eye image IR with the light L20 containing and propagating from the external landscape to the observer.

The left-eye combining optical system 130L may include a first left-eye holographic optical element 131L, a second left-eye holographic optical element 132L, and a third left-eye holographic optical element 133L sequentially arranged along an optical path of the left-eye image IL projected from the left-eye projection optical system 120L. Similar to the combining optical system 130 described above, the left eye combining optical system 130L may be configured to simultaneously form a plurality of left-eye images IL at a plurality of different positions in the horizontal direction. In addition, the left eye combining optical system 130L may be configured to transmit the light L20 from the outside. Therefore, an observer may see the left-eye image IL and the external landscape together through the left eye EL.

The right-eye combining optical system 130R may include a first right-eye holographic optical elements 131R, a second right-eye holographic optical elements 132R, and third right-eye holographic optical element 133R sequentially arranged along an optical path of the right-eye image IR projected from the right-eye projection optical system 120R. The right-eye combining optical system 130R may be configured to simultaneously form a plurality of right-eye images IR at a plurality of different positions in the horizontal direction. In addition, the right-eye combining optical system 130R may be configured to transmit the light L20 from the outside. Therefore, an observer may see the right-eye image IR and the external landscape together through the left eye EL.

The left-eye image forming apparatus 110L may include a left eye light source 101L and a left eye spatial light modulator 102L, and the right-eye image forming apparatus 110R may include a right eye light source 101R and a right eye spatial light modulator 102R. The display apparatus 100*a* may be configured such that the left-eye image IL formed by the left-eye image forming apparatus 110L and the right-eye image IR formed by the right-eye image forming apparatus 110R have different viewpoints. For example, the left eye spatial light modulator 102L may form the left-eye image IL having a viewpoint viewed from the observer's left eye EL, and the right eye spatial light modulator 102R may form the right-eye image IR having a viewpoint viewed from the observer's right eye ER. Then, the display apparatus 100a may provide the observer with a 3D image having binocular parallax.

Figure 6:
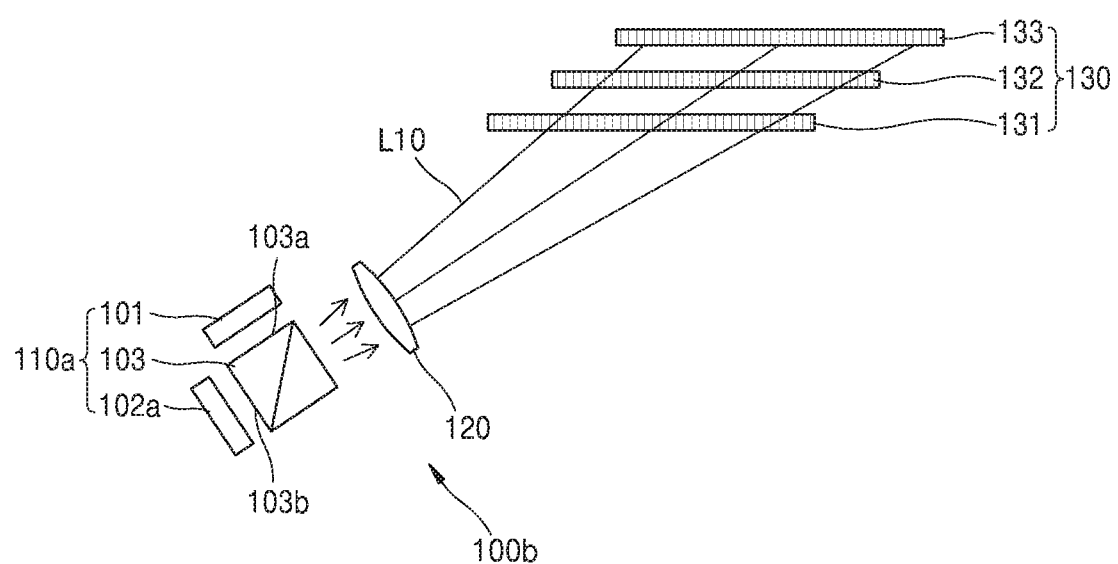
FIG. 6 is a view of a configuration of a display apparatus according to another example embodiment.

FIG. 1 shows that the spatial light modulator 102 is a transmissive spatial light modulator that modulates the phase or amplitude of transmitted light while transmitting incident light. However, embodiments are not necessarily limited thereto. For example, FIG. 6 schematically shows a configuration of a display apparatus 100b according to another example embodiment. Referring to FIG. 6, the display apparatus 100b may include an image forming apparatus 110a, the projection optical system 120, and the combining optical system 130. Configurations and operations of the projection optical system 120 and the combining optical system 130 of the display apparatus 100b illustrated in FIG. 6 are the same as the configurations and operations of the projection optical system 120 and the combining optical system 130 of the display apparatus 100 described with reference to FIG. 1.

The image forming apparatus 110a of the display apparatus 100b illustrated in FIG. 6 may include the light source 101, a beam splitter 103, and a spatial light modulator 102a. The light source 101 may be located to face a first surface 103a of the beam splitter 103, and the spatial light modulator 102a may be located to face a second surface 103b adjacent to the first surface 103a of the beam splitter 103. The beam splitter 103 may be configured to reflect illumination light emitted from the light source 101 and provide the illumination light to the spatial light modulator 102a and to transmit the image L10 formed by the spatial light modulator 102a. For example, the beam splitter 103 may be a translucent mirror that reflects a portion of incident light and transmits the remaining portion, or may be a polarization beam splitter that reflects light having a first linear polarization component and transmits light having a second linear polarization component perpendicular to the first linear polarization component. The spatial light modulator 102a may be a reflective spatial light modulator that modulates reflected light while reflecting incident light. For example, the reflective spatial light modulator 102a may include liquid crystal on silicon (LCoS), a digital micro-mirror device (DMD), or the like. The configuration of the image forming apparatus 110a including the reflective spatial light modulator 102a may also be applied to the display apparatus 100a illustrated in FIG. 5.

Figure 7:
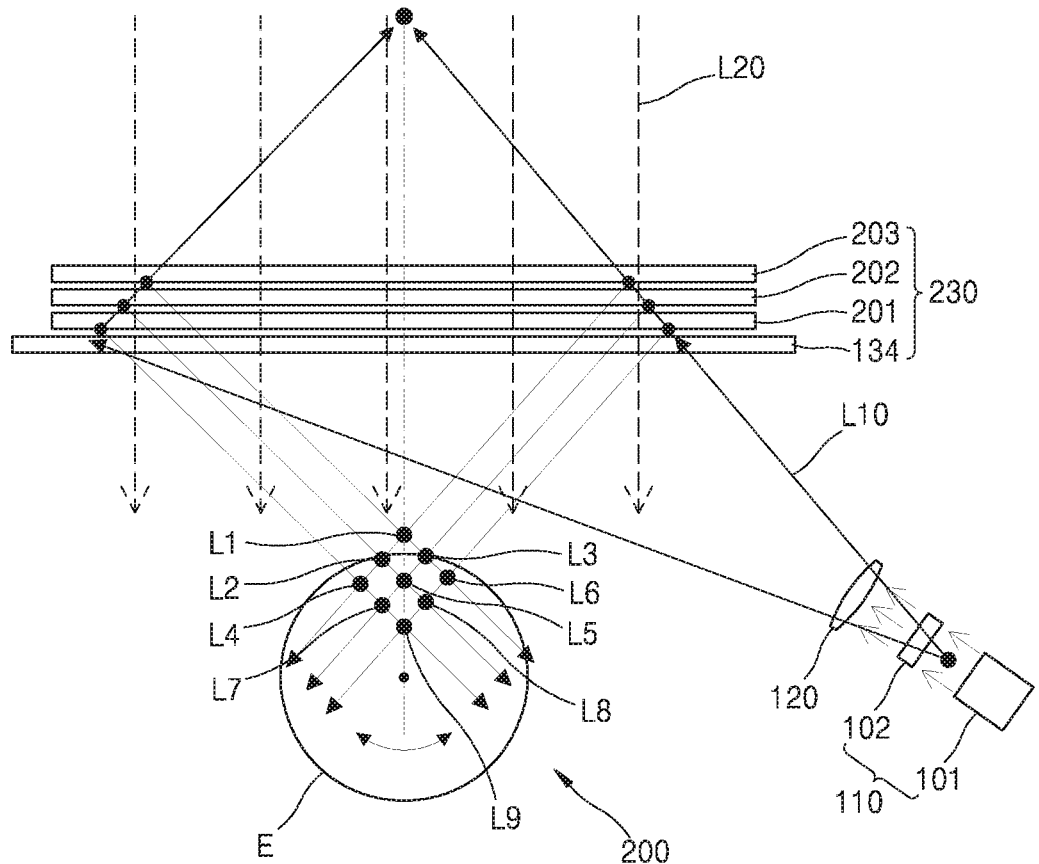
FIG. 7 is a view of a configuration of a display apparatus according to another example embodiment.

FIG. 7 schematically shows a configuration of a display apparatus 200 according to another example embodiment. Referring to FIG. 7, the display apparatus 200 may include the image forming apparatus 110, the projection optical system 120, and a combining optical system 230. The configurations of the image forming apparatus 110 and the projection optical system 120 of the display apparatus 200 illustrated in FIG. 7 may be the same as the configurations of the image forming apparatus 110 and the projection optical system 120 of the display apparatus 100 illustrated in FIG. 1.

The combining optical system 230 may include one holographic optical element 134 and a plurality of translucent mirrors, for example, a first mirror 201, a second mirror 202, and a third mirror 203, which are sequentially arranged along the optical path of the image L10 projected from the projection optical system 120. For example, the holographic optical element 134, the first translucent mirror 201, the second translucent mirror 202, and the third translucent mirror 203 may be sequentially arranged along the optical path of the image L10 projected from the projection optical system 120. FIG. 7 illustrates three translucent mirrors, that is, the first mirror 201, the second mirror 202, and the third mirror 203, by way of example, but is not necessarily limited thereto. The combining optical system 230 may include two or more translucent mirrors as needed.

Figure 8:
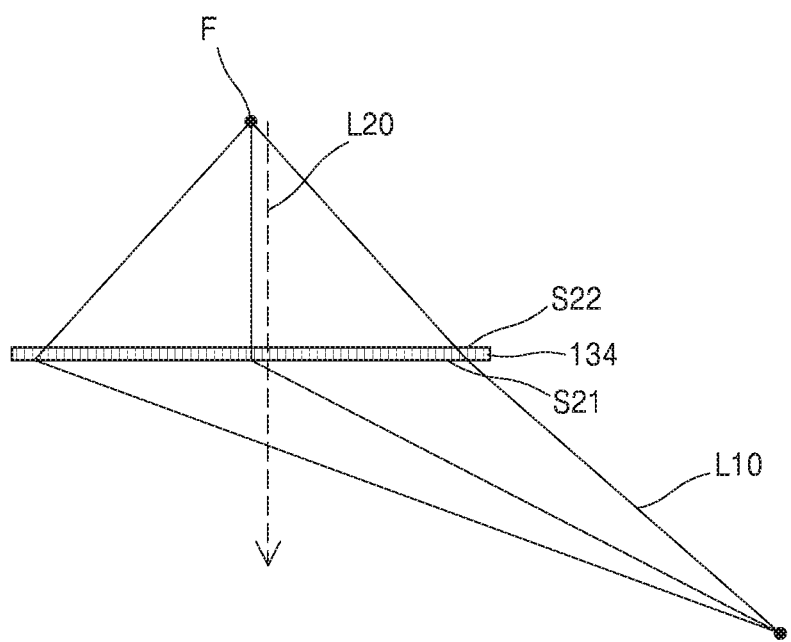
FIG. 8 is an exemplary view of an operation of a holographic optical element of the display apparatus shown in FIG. 7.

In the display apparatus 100 illustrated in FIG. 1, the first holographic optical element 131, the second holographic element 132, and the third holographic element 133 are reflective holographic optical elements. However, in the display apparatus 200 illustrated in FIG. 7, the holographic optical element 134 is a transmissive holographic optical element in which diffracted light is focused along a direction in which the diffracted light passes through the holographic optical element 134. For example, FIG. 8 is an exemplary view of an operation of the holographic optical element 134 of the display apparatus 200 illustrated in FIG. 7. Referring to FIG. 8, the holographic optical element 134 may include a first surface S21 configured to diffract incident light and a second surface S22 located opposite the first surface S21 and configured to transmit incident light. The holographic optical element 134 may be configured to diffract incident light incident on the first surface S21 to focus the incident light at a certain position F in a space facing the second surface S22. Thus, the holographic optical element 134 may focus the transmitted light passing through the holographic optical element 134 and may be a transmissive holographic optical element.

The first surface S21 of the holographic optical element 134 may include two-dimensional or three-dimensional patterns of materials having different refractive indices such that incident light may be diffracted and focused at a certain focal position. Then, the first surface S21 of the holographic optical element 134 may collect light at one point by changing a traveling direction of light by diffracting the light incident in a specific angular range and generating destructive interference and constructive interference depending on the size, height, period, etc. of patterns. For example, since the image L10 enlarged and diverged by the projection optical system 120 is incident obliquely on the first surface S21 of the holographic optical element 134, the first surface S21 of the holographic optical element 134 may be configured to diffract incident light that is divergent and incident obliquely on the first surface S21 and converge the incident light in a direction perpendicular to the first surface S21.

For this purpose, reference light having the same divergence angle as that of the image L10 projected by the projection optical system 120 is radiated onto a first surface of a photosensitive material in the form of a plate. An incident angle at which the reference light is incident on the photosensitive material is set equal to an angle at which the image L10 is incident on the first surface S21 of the holographic optical element 134. At the same time, the photosensitive material may be irradiated with object light that passes through the photosensitive material from the second surface of the photosensitive material to the first surface of the photosensitive material and converges at a certain focal length facing the second surface of the photosensitive material using a convex lens or the like. Then, an interference pattern of the reference light and the object light is formed on the photosensitive material, and the holographic optical element 134 may be manufactured by developing the photosensitive material exposed by the interference pattern.

When the image L10 having the same divergence angle as that of the reference light is incident on the first surface S21 of the holographic optical element 134 at the same incident angle as that of the reference light, light diffracted at the first surface S21 of the first holographic optical element 131 may converge at a certain focal length while traveling in the same direction as that of the object light. For example, chief ray of the image L10 projected by the projection optical system 120 is diffracted near the center of the first surface S21 of the holographic optical element 134 to travel in a direction perpendicular to the second surface S22 of the holographic optical element 134. In addition, marginal ray of the image L10 projected by the projection optical system 120 is diffracted near the edge of the first surface S21 of the holographic optical element 134 to travel in a direction that converges toward the chief ray. Then, the chief ray and the marginal ray are collected at a focal point F in the space facing the second surface S22 of the holographic optical element 131. In addition, the external light L20 incident on the second surface S22 of the holographic optical element 134 passes through the holographic optical element 134 as it is.

Figure 9:
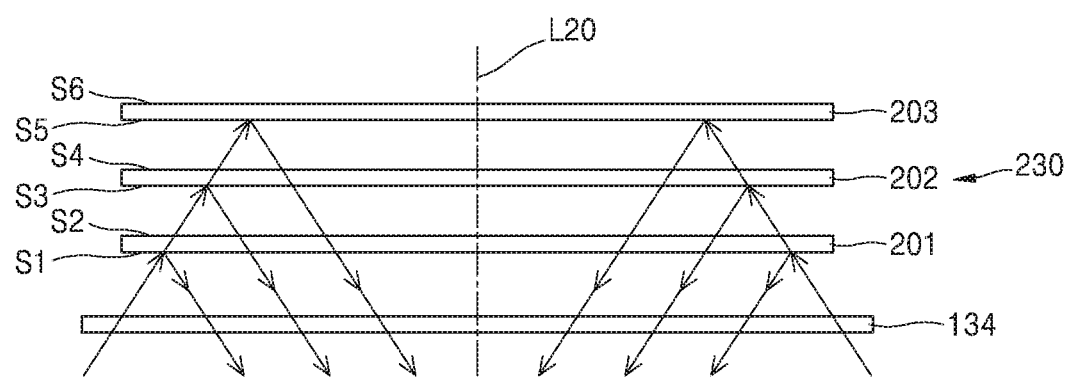
FIG. 9 is an exemplary view of a configuration and operation of a combiner of the display apparatus illustrated in FIG. 7.

FIG. 9 is an exemplary view of a configuration and operation of the combining optical system 230 of the display apparatus 100 illustrated in FIG. 7. Referring to FIG. 9, the first translucent mirror 201, the second translucent mirror 202, and the third translucent mirror 203 are sequentially arranged above the holographic optical element 134 in a vertical direction. In other words, the first translucent mirror 201, the second translucent mirror 202, and the third translucent mirror 203 may be arranged at different positions in the vertical direction. The first translucent mirror 201 may include a first surface S1 which transmits a portion of incident light and reflects the remaining portion and a second surface S2 located opposite the first surface S1 and configured to transmit incident light. Also, the second translucent mirror 202 may include a third surface S3 which transmits a portion of incident light and reflects the remaining portion and a fourth surface S4 located opposite the third surface S3 and configured to transmit incident light. The third translucent mirror 203 may include a fifth surface S5 which transmits a portion of incident light and reflects the remaining portion and a sixth surface S6 located opposite the fifth surface S5 and configured to transmit incident light.

A portion of the image L10 diffracted and converged by the holographic optical element 134 is reflected by the first translucent mirror 201 and the remaining portion passes through the first translucent mirror 201. The image L10 reflected by the first translucent mirror 201 converges on a space facing the first surface S21 of the holographic optical element 134 while passing through the holographic optical element 134. In addition, a portion of the image L10 passing through the first translucent mirror 201 is reflected by the second translucent mirror 202, and the remaining portion passes through the second translucent mirror 202. The image L10 converges on the space facing the first surface S21 of the holographic optical element 134 while in turn passing through the first translucent mirror 201 and the holographic optical element 134. In addition, a portion of the image L10 passing through the second translucent mirror 202 is reflected by the third translucent mirror 203, and converges on the space facing the first surface S21 of the holographic optical element 134 while in turn passing through the second translucent mirror 202, the first translucent mirror 201, and the holographic optical element 134. In addition, the external light L20 incident on the sixth surface S6 of the third translucent mirror 203 may pass through the third translucent mirror 203, the second translucent mirror 202, the first translucent mirror 201, and the holographic optical element 134.

Referring again to FIG. 7, rays reflected from the first translucent mirror 201, the second translucent mirror 202, and the third translucent mirror 203 cross each other, and first to ninth images L1 to L9 may be formed at a plurality of different positions in the space facing the first surface S21 of the holographic optical element 134. For example, the first image L1 may be formed while the rays reflected from the third translucent mirror 203 cross each other, the fifth image L5 may be formed while the rays reflected from the second translucent mirror 202 cross each other, and the ninth image L9 may be formed while the rays reflected from the first translucent mirror 201 cross each other. The first image L1, the fifth image L5, and the ninth image L9 may be spaced apart from one another in the vertical direction. The vertical direction may be defined as a direction perpendicular to the first surface S21 and the second surface S22 of the holographic optical element 134.

In addition, the second image L2 and the third image L3 may be formed while the rays reflected from the second translucent mirror 202 and the rays reflected from the third translucent mirror 203 cross each other, the fourth image L4 and the sixth image L6 may be formed while the light rays reflected from the first translucent mirror 201 and the light rays reflected from the third translucent mirror 203 cross each other, and the seventh image L7 and the eighth image L8 may be formed while the light rays reflected from the first translucent mirror 201 and the light rays reflected from the second translucent mirror 202 cross each other. The second image L2 and the third image L3 may be spaced apart from each other at different positions in a horizontal direction on the same plane. The horizontal direction may be defined as a direction parallel to the first surface S21 and the second surface S22 of the holographic optical element 134. In addition, the fourth image L4 and the sixth image L6 may be apart from each other at different positions in the horizontal direction on the same plane, and the seventh image L7 and the eighth image L8 may be apart from each other at different positions in the horizontal direction on the same plane.

The first to ninth images L1 to L9 may be the same image as the image L10 projected by the projection optical system 120. As a result, since an area in which an observer may view an image is widened, a viewing window of the display apparatus 200 is widened. However, since positions of the first translucent mirror 201, the second translucent mirror 202, and the third translucent mirror 203 are different in the vertical direction, lengths of optical paths of the first to ninth images L1 to L9 are different from each other. As a result, brightnesses of the first to ninth images L1 to L9 may be different from each other. Therefore, reflectances of the first translucent mirror 201, the second translucent mirror 202, and the third translucent mirror 203 may be different from each other such that the first to ninth images L1 to L9 may have substantially the same brightness. For example, the third translucent mirror 203 may be designed to have higher reflectance than that of the second translucent mirror 202, and the second translucent mirror 202 may be designed to have higher reflectance than that of the first translucent mirror 201.

Figure 10:
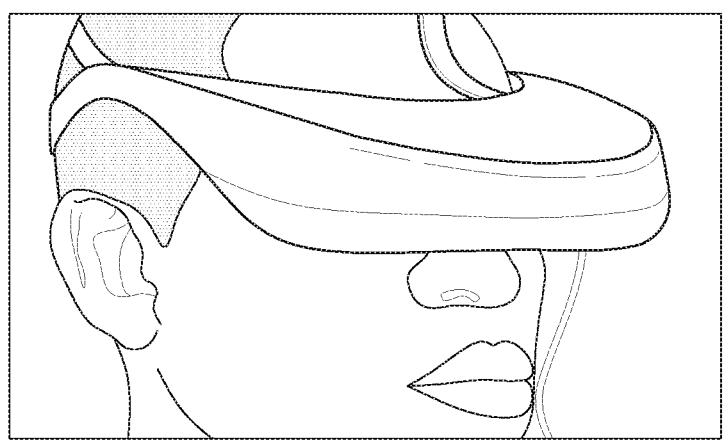
FIGS. 10, 11, and 12 are views of various electronic devices to which a display apparatus may be applied according to example embodiments.
Figure 11:
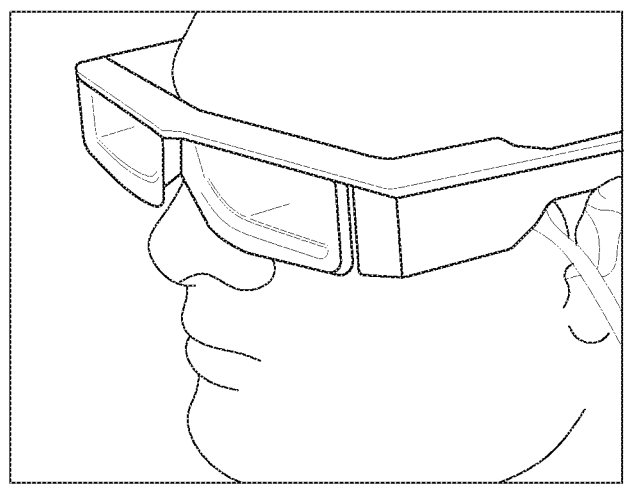
Figure 12:
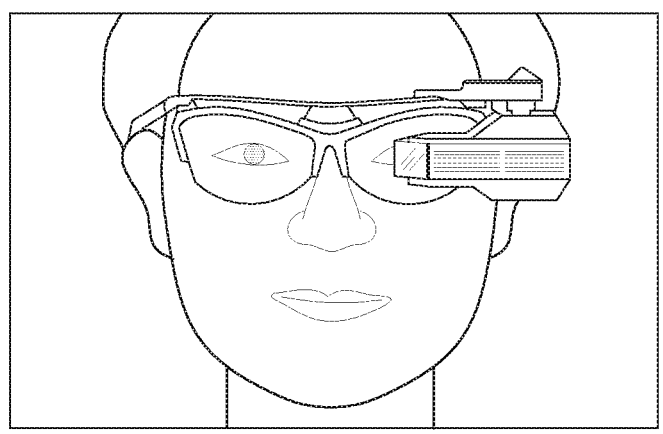

FIGS. 10, 11, and 12 show various electronic devices to which the display apparatus according to the above-described example embodiments may be applied. As shown in FIGS. 10, 11, and 12, the display apparatus may constitute a wearable device. In other words, the display apparatus may be applied to a wearable device. For example, the display apparatus may be applied to a head mounted display (HMD). In addition, the display apparatus may be applied to glasses-type displays, goggle-type displays, and the like. Wearable electronic devices shown in FIGS. 10, 11, and 12 may be operated in conjunction with a smartphone. Such a display apparatus may be a virtual reality (VR) display apparatus, an AR display apparatus, or an MR display apparatus manufactured in the form of a head mounted type, glasses type, or goggles type capable of providing VR or a virtual image and a real external landscape together.

In addition, the display apparatus may be provided in a smartphone, and the smartphone itself may be used as a VR display apparatus, an AR display apparatus, or an MR display apparatus. The display apparatus may be applied to a small electronic device such as a mobile electronic device that is not the wearable device as shown in FIGS. 10, 11, and 12. In addition, application fields of the display apparatus may vary. For example, the display apparatus may be applied not only to implementing VR, AR, or MR, but also to other fields. For example, the display apparatus may also be applied to a small television or a small monitor that a user may wear.

Although the above-described display apparatus having the wide viewing window described above has been described with reference to the embodiments shown in the drawings, they are only examples. Descriptions of features or aspects within each example embodiment should typically be considered as available for other similar features or aspects in other embodiments. It should be understood that example embodiments described herein should be considered in a descriptive sense only and not for purposes of limitation. The scope of rights is indicated in the claims rather than the above description, and all differences within the scope of equivalents should be construed as being included in the scope of rights.

While example embodiments have been described with reference to the figures, it will be understood by those of ordinary skill in the art that various changes in form and details may be made therein without departing from the spirit and scope as defined by the following claims.

What is claimed is:

1. A display apparatus comprising:
an image forming apparatus configured to form an image;
a projection optical system configured to project the image formed by the image forming apparatus; and
a combining optical system configured to provide the image projected from the projection optical system combined with light from an external landscape,
wherein the combining optical system is configured to divide the image projected from the projection optical system into same images and focus the same images on different positions,
wherein the combining optical system comprises a plurality of holographic optical elements sequentially provided along an optical path of the image projected from the projection optical system, and
wherein each of the plurality of holographic optical elements comprises a first surface configured to diffract a portion of incident light and transmit remaining portion of the incident light, and a second surface opposite the first surface and configured to transmit incident light.

2. The display apparatus of claim 1, wherein each of the plurality of holographic optical elements comprises a reflective holographic optical element configured to diffract incident light that is incident on the first surface and to focus the incident light that is diffracted in a space facing the first surface.

3. The display apparatus of claim 2, wherein each of the plurality of holographic optical elements is configured to diffract incident light that is incident obliquely on the first surface and to converge the incident light that is diffracted in a direction perpendicular to the first surface.

4. The display apparatus of claim 2, wherein the plurality of holographic optical elements comprise a first holographic optical element and a second holographic optical element sequentially provided along the optical path of the image projected from the projection optical system,
wherein the first holographic optical element is configured to focus the image projected from the projection optical system to a first position and to form a first image on the first position, and
wherein the second holographic optical element is configured to focus the image projected from the projection optical system and transmitted by the first holographic optical element to a second position different from the first position and to form a second image on the second position.

5. The display apparatus of claim 4, wherein the first holographic optical element is configured to transmit an image that is diffracted by the second holographic optical element.

6. The display apparatus of claim 4, wherein the first image and the second image are identical to each other, and
wherein the first position and the second position are spaced apart from each other in a direction parallel to a first surface of the first holographic optical element.

7. The display apparatus of claim 4, wherein the first position and the second position are on a single plane parallel to the first surface of the first holographic optical element.

8. The display apparatus of claim 4, wherein the first holographic optical element and the second holographic optical element are identical to each other.

9. The display apparatus of claim 4, wherein a focal length of the first holographic optical element is different from a focal length of the second holographic optical element.

10. The display apparatus of claim 4, wherein the first holographic optical element and the second holographic optical element are provided to be shifted from each other in a direction parallel to a first surface of the first holographic optical element.

11. The display apparatus of claim 4, wherein a diffraction efficiency of the second holographic optical element is greater than a diffraction efficiency of the first holographic optical element.

12. The display apparatus of claim 4, wherein the first holographic optical element and the second holographic optical element are spaced apart from each other in a direction perpendicular to a first surface of the first holographic optical element.

13. The display apparatus of claim 4, wherein a second surface of the first holographic optical element and a first surface of the second holographic optical element are in contact with each other.

14. The display apparatus of claim 1, including a virtual reality (VR) display apparatus, an augmented reality (AR) display apparatus, or a mixed reality (MR) display apparatus implemented in a form of a head mounted type apparatus, glasses type apparatus, or goggles type apparatus.

15. A display apparatus comprising:
an image forming apparatus configured to form an image;

a projection optical system configured to project the image formed by the image forming apparatus; and a combining optical system configured to provide the image projected from the projection optical system combined with light from an external landscape, wherein the combining optical system is configured to divide the image projected from the projection optical system into same images and focus the same images on different positions, wherein the combining optical system comprises a holographic optical element and a plurality of translucent mirrors sequentially provided along an optical path of the image projected from the projection optical system, wherein the holographic optical element comprises a first surface configured to diffract incident light, and a second surface opposite the first surface and configured to transmit incident light, and wherein the holographic optical element comprises a transmissive holographic optical element configured to diffract incident light that is incident on the first surface and to focus the incident light that is diffracted to a space facing the second surface.

16. The display apparatus of claim 15, wherein the holographic optical element is configured to diffract incident light that is divergent and incident obliquely on the first surface and to converge the incident light that is diffracted in a direction perpendicular to the second surface.

17. The display apparatus of claim 15, wherein each of the plurality of translucent mirrors is configured to transmit a portion of incident light and reflect remaining portion of the incident light, and wherein the plurality of translucent mirrors comprise a first translucent mirror and a second translucent mirror sequentially provided along the optical path of the image projected from the projection optical system.

18. The display apparatus of claim 17, wherein the first translucent mirror is configured to reflect an image diffracted by the holographic optical element to form a first image on a first position in a space facing the first surface of the holographic optical element, and wherein the second translucent mirror is configured to form a second image on a second position that is different from the first position by reflecting an image diffracted by the holographic optical element and transmitted by the first translucent mirror.

19. The display apparatus of claim 18, wherein the first image and the second image are identical to each other, and wherein the first position and the second position are spaced apart from each other in a direction perpendicular to a first surface of a first holographic optical element.

20. The display apparatus of claim 18, wherein an image reflected by the first translucent mirror and an image reflected by the second translucent mirror converge and cross each other at a third position and a fourth position that is different from the third position in the space facing the first surface of the holographic optical element to form a third image and a fourth image, respectively.

21. The display apparatus of claim 20, wherein the third image and the fourth image are identical to each other, and wherein the third position and the fourth position are spaced apart from each other in a direction parallel to a first surface of a first holographic optical element.

22. The display apparatus of claim 17, wherein a reflectance of the second translucent mirror is greater than a reflectance of the first translucent mirror.

23. A display apparatus comprising:

an image forming apparatus configured to form an image;

a projection optical system configured to project the image formed by the image forming apparatus; and a combining optical system configured to provide the image projected from the projection optical system combined with light emitted from an external landscape, the combining optical system comprising a plurality of holographic optical elements sequentially provided along an optical path of the image projected from the projection optical system, wherein the plurality of holographic optical elements are configured to respectively focus a same image on different positions, and wherein each of the plurality of holographic optical elements comprises a first surface configured to diffract a portion of incident light and transmit remaining portion of the incident light, and a second surface opposite the first surface and configured to transmit incident light.

* * * * *